United States Patent
Eronen et al.

(10) Patent No.: US 11,348,288 B2
(45) Date of Patent: May 31, 2022

(54) MULTIMEDIA CONTENT

(71) Applicant: Nokia Technologies Oy, Espoo (FI)

(72) Inventors: Antti Eronen, Tampere (FI); Arto Lehtiniemi, Lempäälä (FI); Jussi Leppänen, Tampere (FI); Juha Arrasvuori, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/472,539

(22) PCT Filed: Dec. 28, 2017

(86) PCT No.: PCT/FI2017/050943
§ 371 (c)(1),
(2) Date: Jun. 21, 2019

(87) PCT Pub. No.: WO2018/122458
PCT Pub. Date: Jul. 5, 2018

(65) Prior Publication Data
US 2019/0318510 A1    Oct. 17, 2019

(30) Foreign Application Priority Data
Dec. 30, 2016    (EP) .................................... 16207436

(51) Int. Cl.
*G06T 5/00*    (2006.01)
*G06T 11/00*    (2006.01)
*G10L 21/10*    (2013.01)

(52) U.S. Cl.
CPC ............ *G06T 11/001* (2013.01); *G06T 5/002* (2013.01); *G10L 21/10* (2013.01)

(58) Field of Classification Search
CPC ........ G06T 11/001; G06T 5/002; G10L 21/10
USPC .......................................................... 345/428
See application file for complete search history.

(56) References Cited

U.S. PATENT DOCUMENTS

| | | | |
|---|---|---|---|
| 6,369,822 B1 | 4/2002 | Peevers et al. | |
| 6,490,359 B1 | 12/2002 | Gibson | |
| 8,068,105 B1 | 11/2011 | Classen | |
| 9,530,426 B1 * | 12/2016 | Wright | H04S 1/002 |
| 10,445,936 B1 * | 10/2019 | Charlton | G06F 3/165 |
| 2010/0272297 A1 | 10/2010 | Boretzki | |
| 2011/0037777 A1 * | 2/2011 | Lindahl | G06F 1/1626 345/619 |
| 2014/0233917 A1 | 8/2014 | Xiang | |

(Continued)

FOREIGN PATENT DOCUMENTS

| | | |
|---|---|---|
| EP | 3313101 A1 | 4/2018 |
| GB | 2543275 A | 4/2017 |
| GB | 2543276 A | 4/2017 |

OTHER PUBLICATIONS

Office action received for corresponding European Patent Application No. 16207436.3, dated Sep. 25, 2019, 5 pages.

(Continued)

*Primary Examiner* — Jin Ge
(74) *Attorney, Agent, or Firm* — Harrington & Smith

(57) ABSTRACT

A method comprising: determining a portion of a visual scene, wherein the portion is dependent upon a position of a sound source within the visual scene; and enabling adaptation of the visual scene to provide, via a display, spatially-limited visual highlighting of the portion of the visual scene.

18 Claims, 3 Drawing Sheets

(56) References Cited

U.S. PATENT DOCUMENTS

| | | | |
|---|---|---|---|
| 2014/0268356 A1* | 9/2014 | Bolas | G02B 27/0093 359/630 |
| 2014/0280515 A1 | 9/2014 | Wei et al. | |
| 2014/0369506 A1* | 12/2014 | Arrasvuori | G01S 3/8083 381/17 |
| 2015/0003819 A1 | 1/2015 | Ackerman et al. | |
| 2015/0088500 A1 | 3/2015 | Conliffe | |
| 2016/0088417 A1* | 3/2016 | Kim | G02B 27/017 381/17 |
| 2016/0299738 A1 | 10/2016 | Makinen et al. | |
| 2017/0078825 A1* | 3/2017 | Mangiat | H04S 7/304 |
| 2017/0265016 A1* | 9/2017 | Oh | H04S 7/303 |
| 2018/0054689 A1 | 2/2018 | Chen et al. | |
| 2018/0203663 A1* | 7/2018 | Lehtiniemi | G06F 3/0346 |
| 2018/0309937 A1 | 10/2018 | Yoshino et al. | |
| 2019/0011703 A1* | 1/2019 | Robaina | G06F 3/017 |

OTHER PUBLICATIONS

Pihlajamaki et al., "Synthesis of Spatially Extended Virtual Sources with Time-Frequency Decomposition of Mono Signals", Journal of the Audio Engineering Society, vol. 62, No. 7/8, Jul./Aug. 2014, 467-484.

Shah et al., "Metrics for Measuring Ideation Effectiveness", Design Studies, vol. 24, No. 2, Mar. 2003, pp. 111-134.

Smith., "Idea-Generation Techniques: A Formulary of Active Ingredients", Journal of creative behavior, vol. 32, No. 2, 1998, pp. 107-133.

Smith, "Towards a logic of innovation", The International Handbook on Innovation, Dec. 2003. p. 347-365.

Extended European Search Report received for corresponding European Patent Application No. 16207436.3, dated May 11, 2017, 7 pages.

Extended European Search Report received for corresponding European Patent Application No. 16207437.1, dated Jun. 26, 2017, 9 pages.

International Search Report and Written Opinion received for corresponding Patent Cooperation Treaty Application No. PCT/FI2017/050943, dated Mar. 13, 2018, 11 pages.

Non-Final Office action received for corresponding U.S. Appl. No. 15/849,882, dated Sep. 28, 2018, 19 pages.

Office action received for corresponding European Patent Application No. 16207436.3, dated Mar. 27, 2019, 6 pages.

Non-Final Office action received for corresponding U.S. Appl. No. 15/849,882, dated Apr. 4, 2019, 16 pages.

Office action received for corresponding European Patent Application No. 16207437.1, dated Apr. 17, 2020, 4 pages.

Office action received for corresponding European Patent Application No. 16207436.3, dated Sep. 24, 2020, 6 pages.

\* cited by examiner

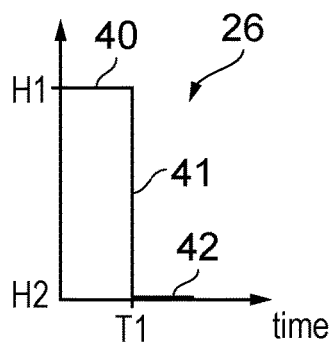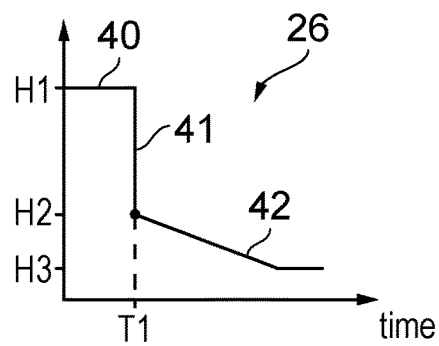
FIG. 6A  FIG. 6B
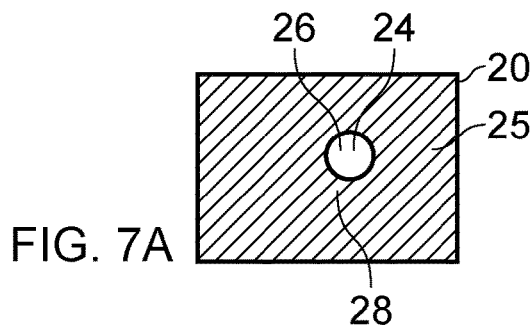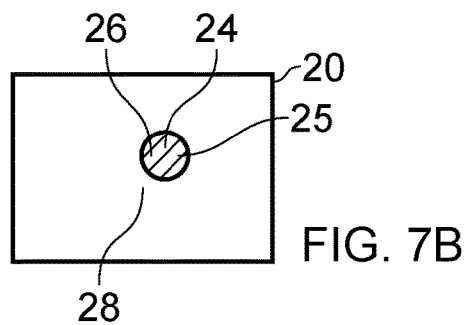
FIG. 7A  FIG. 7B
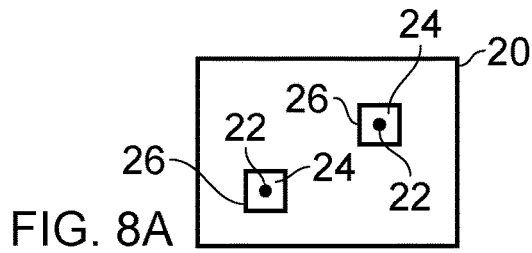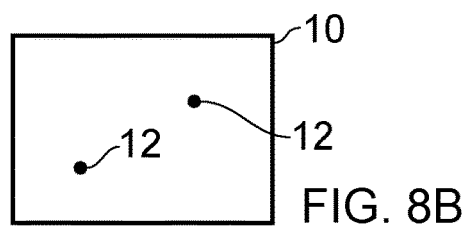
FIG. 8A  FIG. 8B
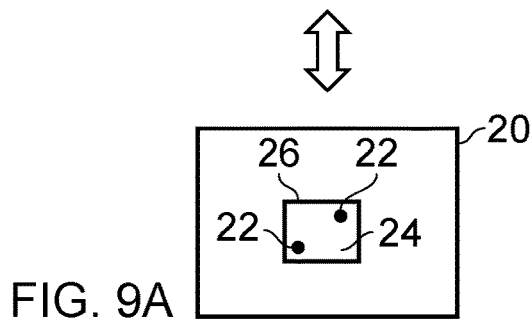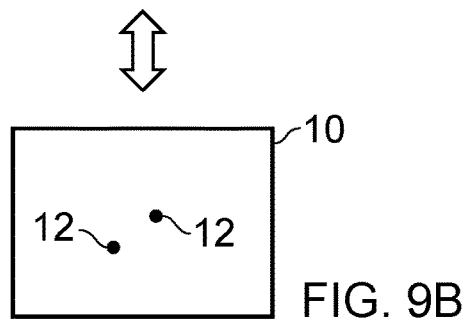
FIG. 9A  FIG. 9B
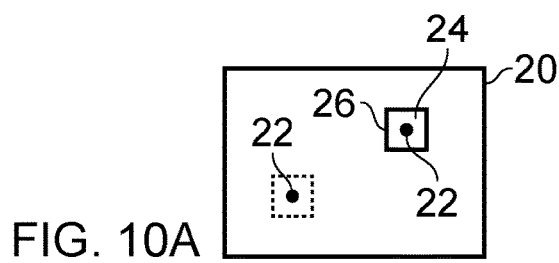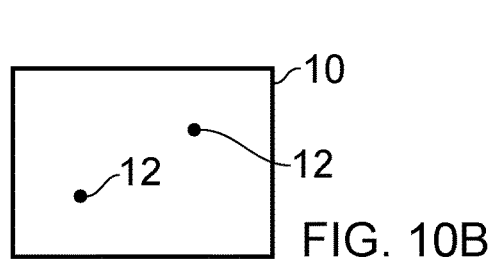
FIG. 10A  FIG. 10B

MULTIMEDIA CONTENT

RELATED APPLICATION

This application was originally filed as Patent Cooperation Treaty Application No. PCT/FI2017/050943 filed 28 Dec. 2017 which claims priority benefit to European Patent Application No. 16207436.3, filed 30 Dec. 2016.

TECHNOLOGICAL FIELD

Embodiments of the present invention relate to multimedia content. In particular, embodiments relate to adapting multimedia content.

BACKGROUND

Multimedia content comprises a visual content and an audio content. The visual content and/or the audio content may be perceived live or they may be recorded and rendered.

For example, in an augmented reality application, at least part of the visual content is observed by a user via a see-through display while another part of the visual content is displayed on the see-through display. The audio content may be live or it may be rendered to a user.

In a virtual reality application, the visual content and the audio content are both rendered.

It may in some circumstances be difficult for a user to easily associate a source of perceived audio content (a sound source) with a particular portion of the visual scene defined by the visual content.

BRIEF SUMMARY

According to various, but not necessarily all, embodiments of the invention there is provided a method comprising: determining a portion of a visual scene, wherein the portion is dependent upon a position of a sound source within the visual scene; and enabling adaptation of the visual scene to provide, via a display, spatially-limited visual highlighting of the portion of the visual scene.

According to various, but not necessarily all, embodiments of the invention there is provided an apparatus comprising: at least one processor; and at least one memory including computer program code, the at least one memory and the computer program code configured to, with the at least one processor, cause the apparatus at least to perform:

causing determining a portion of a visual scene, wherein the portion is dependent upon a position of a sound source within the visual scene; and causing adaptation of the visual scene to provide, via a display, spatially-limited visual highlighting of the portion of the visual scene.

According to various, but not necessarily all, embodiments of the invention there is provided examples as claimed in the appended claims.

BRIEF DESCRIPTION

For a better understanding of various examples that are useful for understanding the detailed description, reference will now be made by way of example only to the accompanying drawings in which:

FIGS. 6A & 6B illustrate schematically a change in the visual highlighting applied to a portion of the visual scene and how that visual highlighting 26 may vary in time and vary differently in time;

FIGS. 7A and 7B illustrate examples of highlighting;

FIGS. 8A and 8B illustrate respectively a visual scene comprising multiple highlighted portions at sound sources and a corresponding sound scene comprising sound objects associated with the sound sources in the visual scene;

FIGS. 9A and 9B illustrate respectively a visual scene and a corresponding sound scene in which highlighted portions merge (or de-merge);

FIGS. 10A and 10B illustrate respectively a visual scene and a corresponding sound scene in which highlighted portions removed or reduced (or added);

DETAILED DESCRIPTION

The following description describes methods, apparatuses and computer programs that assist a user in identifying which portion of a visual scene are associated with a sound source. Spatially-limited visual highlighting of the portion of the visual scene, via a display, identifies the portion of the visual scene associated with a sound source.

In some examples, the display may be a see-through display that displays the highlighting but not the visual scene or not all of the visual scene and in other examples the display may not be a non-see-through display and may display all of the visual scene and also the highlighting.

A user may therefore be able to easily identify which portions of the visual scene are associated with sound sources.

In some, but not necessarily all examples, spatial audio rendering may be used to render sound sources as sound objects at particular positions within a sound scene that corresponds with the visual scene. In this example, the highlighting may be used to draw a user's attention visually to a portion of the visual scene that correspond to a position of a sound object and the highlighting may be moved to identify a position of the sound object as the sound object moves.

The highlighting provides a visualization of one or more sound objects in the sound scene and it may be used to assist a user in editing the sound scene by, for example, repositioning the sound objects or changing sound characteristics of the sound objects.

Figure 1:
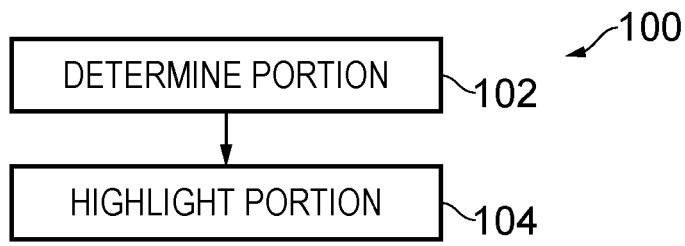
FIG. 1 illustrates an example of a method for highlighting a portion of a visual scene in dependence upon a position of a sound source within the visual scene.

FIG. 1 illustrates an example of a method 100 for highlighting a portion of a visual scene in dependence upon a position of a sound source within the visual scene.

At block 102 of the method 100, the method 100 comprises determining a portion of a visual scene, where the portion is dependent upon a position of a sound source within the visual scene.

Next, at block 104, the method 100 comprises enabling adaptation of the visual scene to provide, via a display, spatially-limited visual highlighting of the portion of the visual scene.

Figure 2A:
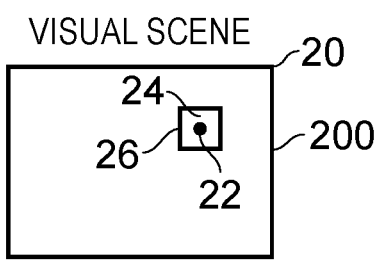
FIG. 2A illustrates an example of a visual scene and FIG. 2B illustrates a corresponding sound scene 10.

FIG. 2A illustrates an example of a visual scene 20. A portion 24 of the visual scene 20 is highlighted 26. The highlighting 26 is spatially-limited visual highlighting that highlights only the portion 24 of the visual scene 20. The highlighted portion 24 of the visual scene 20 is dependent upon a position of a sound source 22 within the visual scene 20.

The visual scene 20 has been adapted to provide, via the display 200, a spatially-limited visual highlighting 26 of the portion 24 of the visual scene.

In this example, but not necessarily all examples, the sound source 22 is an active sound source producing sound that is or can be heard by a user, for example via rendering or live, while the user is viewing the visual scene via the display 200. The display 200 renders at least the highlighting 26. In some examples, the visual scene 20 is viewed through the display 200 (which would then need to be a see-through display). In other example, the visual scene 20 is rendered by the display 200.

Where the active sound source 22 producing sound is or can be rendered to a user while the user is viewing the visual scene via a display, the position of that active sound source 22 may be the same as or different to a position of a sound source that produced the sound when it was recorded.

In an augmented reality application, the display 200 is a see-through display and the visual scene 20 is a real, live scene viewed through the see-through display 200. The sound source 22 may be a live sound source or it may be a sound source that is rendered to the user. The highlighting 26 of the portion 24 of the visual scene 20 is rendered via the see-through display 200. This augmented reality implementation may, for example, be used for capturing an image or images of the visual scene 20 as a photograph or a video. The portion 24 of the visual scene 20 may, for example, be determined via spatial audio analysis and/or image analysis or by processing positional information for sound sources 22 within the visual scene 20.

In another application, the visual scene 20 may be rendered to a user via the display 200, for example, at a location remote from where the visual scene 20 was recorded. This situation is similar to the situation commonly experienced when reviewing images via a television screen, a computer screen or a virtual reality headset. In these examples, the visual scene 20 is a rendered visual scene. The active sound source 22 produces rendered sound, unless it has been muted. This implementation may be particularly useful for editing a sound scene by, for example, modifying characteristics of sound sources and/or moving sound sources within the visual scene 20. The highlighted portion 24 of the visual scene 20 may be determined from analysis of the sound sources 22 of the visual scene 20 and/or image analysis of the visual scene 20 and/or by processing positional information for sound sources 22 within the visual scene 20. In some examples this processing may be done where the visual scene 20 is rendered. In other examples this processing may occur elsewhere and the information that identifies the highlighted portion 24 of the visual scene 20 may be provided as metadata associated with the rendered visual scene 20.

Figure 2B:
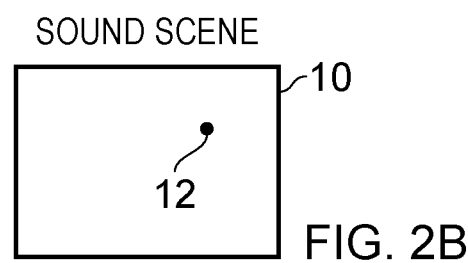

FIG. 2B illustrates an example of a sound scene 10 that corresponds with the visual scene 20. Correspondence in this sense means that there is a one-to-one mapping between the sound scene 10 and the visual scene 20 such that a position in the sound scene 10 has a corresponding position in the visual scene 20 and a position in the visual scene 20 has a corresponding position in the sound scene 10. Corresponding also means that the coordinate system of the sound scene 10 and the coordinate system of the visual scene 20 are in register such that an object is positioned as a sound object in the sound scene and as a visual object in the visual scene at the same common position from the perspective of a user.

In this example, the sound scene 10 comprises a sound object 12 within the sound scene 10. The sound source 22 in the visual scene 20 is the rendered sound object 12.

The sound scene 10 and the visual scene 20 may be three-dimensional scenes. The sound object 12 may be a sound object as recorded or it may be a sound object as rendered. It is possible, for example using spatial audio processing, to modify a sound object 12, for example to change its sound or positional characteristics. For example, a sound object can be modified to have a greater volume, to change its position within the sound scene 10, or to change its spatial extent within the sound scene 10.

In other examples, there may not be a sound scene 10 that corresponds to the visual scene 20. In these examples, the sound source 22 may be associated with a visual object in the visual scene 20. In this example, the sound source 22 is the visual object.

Figure 3A:
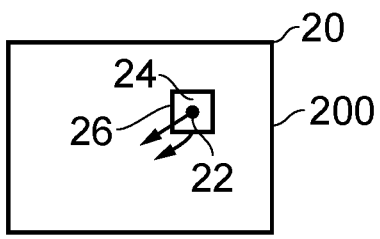
FIGS. 3A and 3B illustrate respectively a visual scene and a corresponding sound scene before movement of the sound source.
Figure 3B:
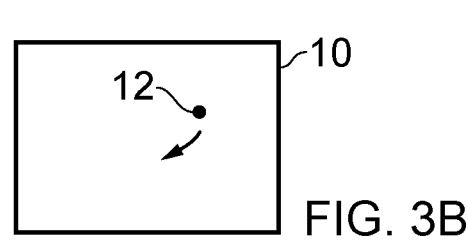
Figure 3C:
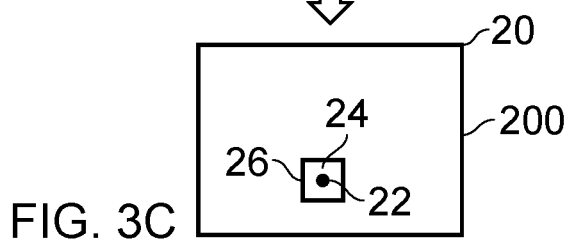
FIGS. 3C and 3D illustrate respectively the same visual scene and corresponding sound scene after movement of the sound source.
Figure 3D:
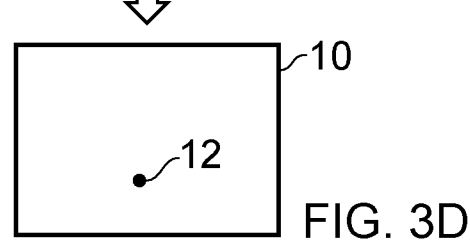

In the examples of FIGS. 3A to 3D, the sound source 22 in the visual scene 20 is also a sound object in the rendered sound scene 10. The position of the sound source 22 in the visual scene 20 corresponds to the position of the sound object 12 in the sound scene 10. FIGS. 3A and 3B illustrate respectively a visual scene 20 and a sound scene before movement of the sound source. FIGS. 3C and 3D illustrate respectively the same visual scene 20 and sound scene after movement of the sound source.

A position of the spatially-limited, visually highlighted portion 24 of the visual scene 20 is dependent upon a position of the sound source 22 within the visual scene 20 (FIG. 3A). The position of the sound source 22 within the visual scene 20 corresponds to the position of the sound object 12 within the sound scene 10 (FIG. 3B). In this example, the position of the spatially-limited, visually highlighted portion 22 of the visual scene 20 corresponds to a position of the sound source 22 within the visual scene and the position of the sound object 12 within the sound scene 10.

The position of the sound source 22 is tracked in these examples. It will be appreciated from FIGS. 3A to 3D, that a position of the spatially-limited, visually highlighted portion 24 of the visual scene 20 tracks a position of the sound source 22 within the visual scene 20 as the sound source 22 moves within the visual scene 20. The moving sound source 22 within the visual scene 20 is a moving sound object 12 within the sound scene 10.

This may be achieved, for example, when recording the visual scene 20 by placing a positioning tag on the sound source 22. The position and the position changes of the sound source 22 within the visual scene 20 can then be recorded as the visual scene 20 is captured. The positions of the sound source 22 within the visual scene 20 may then be used to control a position of the spatially-limited, visually highlighted portion 24 of the visual scene 20. This may be particularly suitable where an up-close microphone such as a boom microphone or a Lavalier microphone is used to record the sound source 22.

In other examples, the position of the sound source 22 within the visual scene may be determined during recording of the sound source 22 by using spatially diverse sound recording. An example of spatially diverse sound recording is using a microphone array. The phase differences between the sound recorded at the different, spatially diverse microphones, provides information that may be used to position the sound source 22 using a beam forming equation. For example, time-difference-of-arrival (TDOA) based methods for sound source localization may be used.

The positions of the sound source 22 within the visual scene 20 may also be determined by post-production annotation. As another example, positions of sound sources may be determined using Bluetooth-based indoor positioning techniques, or visual analysis techniques, a radar, or any suitable automatic position tracking mechanism.

The visual scene 20 will be adapted to include the spatially-limited, visually highlighted portion 24 of the visual scene 20. This may occur at an early stage or at a later stage. Where it occurs later, for example at rendering, it may be based on metadata that identifies the position of a sound source 22 within the visual scene 20, or controls a position of the spatially-limited, visually highlighted portion 24 of the visual scene 20.

FIGS. 4 to 6 illustrate adaptation of the visual scene 20 to provide spatially-limited visual highlighting 26 of the portion 24 of the visual scene 20 in a manner that dynamically varies with time. What causes the variation and the nature of the variation may be user programmable.

Figure 4A:
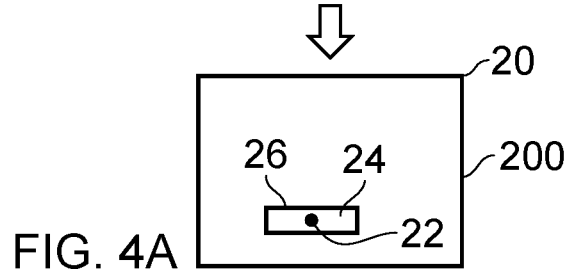
FIGS. 4A and 4B illustrate respectively the same visual scene and sound scene after variation of the highlighting.
Figure 4B:
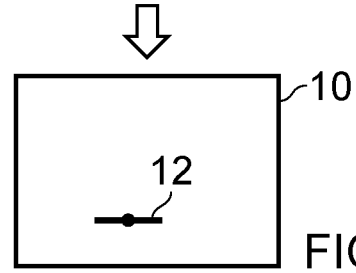

Whereas FIGS. 3C and 3D illustrate respectively a visual scene 20 and a sound scene before variation of the highlighting 26, FIGS. 4A and 4B illustrate respectively the same visual scene 20 and sound scene 10 after variation of the highlighting 26.

The sound scene 10 of FIG. 4B differs from the sound scene 10 of FIG. 3D in that the spatial extent of the sound object 12 has been increased so that the sound object has a greater breadth. This change in the characteristic of the sound object 12 causes a change in the highlighted portion 24 of the visual scene 20.

The increase in the breadth of the sound object 10 causes a corresponding increase in a breadth of the highlighted portion 24 of the visual scene 20. In this example, the breadth of the highlighted portion 24 of the visual scene 20 extends so that it is at least as large widthwise as the spatial extent of the sound object 12 of the corresponding sound scene 10 illustrated in FIG. 4B.

In some example, the area of the highlighted portion may remain constant or reduce at a slower rate than the breadth of the highlighted portion 24. The height of the highlighted portion 24 therefore reduces.

Figure 5A:
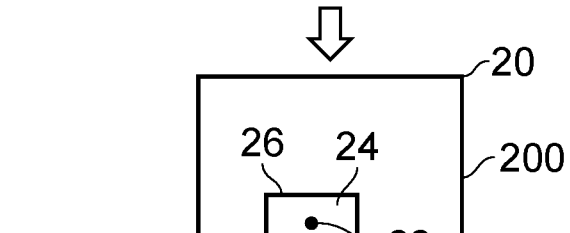
FIGS. 5A and 5B illustrate respectively the same visual scene and sound scene after a further variation of the highlighting.
Figure 5B:
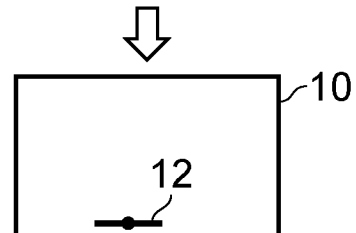

FIGS. 5A and 5B illustrate respectively the same visual scene 20 and sound scene 10 as is illustrated in FIGS. 4A and 4B after a further variation of the highlighting 26.

The sound scene 10 of FIG. 5B differs from the sound scene 10 of FIG. 4B in that the volume of the sound object 12 has been increased so that the sound object has a greater sound intensity. This change in the characteristic of the sound object 12 causes a change in the highlighted portion 24 of the visual scene 20. In this example, in FIG. 5A, the total area of the highlighted portion 24 increases but it retains the same width in this example.

It will therefore be appreciated that visual characteristics of the highlighted portion 24 can be varied dynamically as characteristics of the sound source 22, for example the sound object 12, vary. These changes may be in real time.

The changes to the visual characteristics of the highlighted portion 24 may, for example, include one or more of changing a shape of the highlighted portion 24, changing an area of the highlighted portion 24, changing a highlighting texture of the highlighted portion 24, changing a maximum dimension of the highlighted portion 24, for example its width or its height, changing a minimum dimension of the highlighted portion 24.

The user may program which visual characteristics of the highlighted portion 24 are varied dynamically, what causes the variation and how they are varied.

The changes in characteristics of the sound source 22 that may cause a change in the visual characteristics of the highlighted portion 24 may, for example, include a change in volume and/or a change in spatial extent.

The user may program which sound characteristics of the sound source cause a change in visual characteristics of the highlighted portion 24, and the nature of the change to the visual characteristics of the highlighted portion 24 that occurs.

FIGS. 6A & 6B illustrate schematically a change in the visual highlighting 26 applied to a portion 24 of the visual scene 20 and how that visual highlighting 26 may vary in time and vary differently in time.

In these examples, up to the time T1, the sound source 22 that determines the visual highlighting 26 of the portion 24 is an active sound source and is producing audio. After the time T1 the sound source 22 is an inactive sound source and does not produce audio. This may be, for example, because the recorded sound source did not produce audio or because the rendered sound source has been muted.

The visual highlighting 26 undergoes a transition 41 at the time T1. The highlighting exists in a first state 40 before the time T1 and in a second state 42 after time T1.

In FIG. 6A, the first state 40 is when highlighting 26 is switched on and the second state is when highlighting is switched off.

In FIG. 6B, the first state 40 is when highlighting 26 is switched on and the second state 42 is a state of reduced highlighting. Reduced highlighting may be used to indicate that a sound source 22 is not currently active but was previously active, or will be active in future, for example within a user determined time.

In this particular example, the reduced highlighting is used to indicate that a sound source 22 is not currently active but was previously active, and the highlighting reduces as the period of inactivity increases. In this example, the highlighting H intensity decays after the time T1 very quickly to a second state (H2) during which it decays more slowly, possibly to a third constant state (H3). In this way, a sound source 22 that is active can be distinguished from a sound source 22 that is inactive and, in addition, it is still possible for a user to recognize the presence of an inactive sound source 22. However, the differentiation of the inactive sound source from the background becomes less over time.

In some but not necessarily all examples the user may program highlighting by programming one or more of the first state H1, the second state H2, the transition from the first state to the second state H1→H2, if appropriate a third state H3 and the transition from the second state to the third state H2→H3.

In some but not necessarily all examples the user may program triggers that cause the transition from the first state to the second state H1→H2 and, if appropriate, the transition from the second state to the third state H2→H3.

The direction of transition described above assume highlighting is being switched-off or reduce. However, highlighting may also be switched-on or increase and in these examples, the direction of transition is reversed. In some but not necessarily all examples the user may program triggers that cause the transition from the second state to the first state H2→H1 and, if appropriate, the transition from the third state to the first state or second state.

It will therefore be appreciated that adaptation of the visual scene 20 to provide spatially-limited, visual highlighting 26 of the portion 24 of the visual scene 20 may be dynamically varied over time to emphasize an active sound source 22 compared to an inactive sound source 22. Furthermore, adaptation of the visual sound scene 20 to provide spatially-limited visual highlighting 26 of the portion 24 of the visual scene 20 may be dynamically varied over time to emphasize a short-term inactive sound source 22 compared to a longer-term inactive sound source 22.

FIGS. 7A and 7B illustrate examples of highlighting 26. The spatially-limited highlighted portion 24 is a sub-part, less than the whole, of the visual scene 20. The purpose of the highlighting 26 is to draw attention of the user to the portion 24. In these examples, adaptation of the visual scene 20 provides spatially-limited visual highlighting 26 of the portion 24 of the visual scene 20. The adaptation visually differentiates the highlighted portion 24 of the visual scene 20 from at least neighboring portions 28 of the visual scene 20 by applying a visual effect 25 to a first area of the visual scene 20 but not to a second adjacent area of the visual scene 20.

In the example of FIG. 7A, the second area (un-hatched) is the highlighted portion 24 of the visual scene 20 and the first area (hatched) is the neighboring portions 28 of the visual scene 20 adjacent the highlighted portion 24.

In the example of FIG. 7B the first area (hatched) is the highlighted portion 24 of the visual scene 20 and the second area (unhatched) is neighboring portions 28 of the visual scene 20 adjacent the highlighted portion 24.

The visual effect 25 may in some, but not necessarily all, examples be applied with spatial consistency over the area to which it is applied. The visual effect 25 may in some but not necessarily all examples be programed by a user via a user input device.

In the example of FIG. 7A, the visual effect 25 defines a window to or around the highlighted portion 24. The visual effect 25 is an applied image filter that has a transparent window to the highlighted portion 24. The image filter is applied to the visual scene 20 and may, for example, reduce sharpness of the visual image outside the transparent window. Therefore the hatched portion in FIG. 7B is blurred (soft focus) whereas the unhatched highlighted portion 24 is sharp (sharp focus).

Referring back to FIGS. 6A and 6B, the y-axis H of these figures may, in this example, therefore indicate sharpness of the image of the highlighted portion 24.

Whereas the previous examples have concentrated on the description of only a single highlighted portion 24 corresponding to a single sound source 22, it is also possible for there to be in these examples and in other examples more than one sound source 22 and also more than one highlighted portion 24. For example, as illustrated in FIGS. 8A and 8B, which illustrate respectively a visual scene 20 and a corresponding sound scene 10, the method 100 may determine multiple portions 24 of a visual scene 20, wherein the portions 24 are dependent upon positions of multiple sound sources 22 within the visual scene 20; and enable adaptation of the visual scene 20 to provide, via the display 200, spatially-limited visual highlighting 26 of the portions 24 of the visual scene 20.

A position of each highlighted portion 24 of the visual scene 20 may be dependent upon and may correspond to a position of an associated sound source 22 within the visual scene 20. The position of the sound source 22 may, as previously described, correspond to the position of a sound object 12 within a sound scene 10.

As illustrated in FIGS. 9A and 9B, which illustrate respectively a visual scene 20 and a corresponding sound scene 10, in some circumstances it may be desirable to merge highlighted portions 24. In the example of FIGS. 9A and 9B, the sound sources 22 that determine the positions of the highlighted portions 24 come into close proximity and the associated multiple highlighted portions 24 merge into a single highlighted portion 24. This may, for example, occur where two sound sources 22 are brought together for example if two musicians were to jam together. It is also possible for a single highlighted portion 24 to split into multiple highlighted portions 24 via a reverse process.

In some circumstances a user may be able to define, via a user input device, how many highlighted portions 24 may be displayed for the visual scene 20. This may place a limit on the splitting of highlighted portions 24 and/or may cause multiple highlighted portions 24 to be merged.

As illustrated in FIGS. 10A and 10B, which illustrate respectively a visual scene 20 and a corresponding sound scene 10, in some circumstances it may be desirable to remove or reduce highlighting of a portion 24.

The transition from FIG. 10A to 8A illustrate a visual scene 20 in which the method 100 comprises automatically enabling adaptation of the visual scene 20 to provide the spatially-limited visual highlighting 26 of the portion 24 of the visual scene 20 in response to the sound source 22 within the visual scene 20 having a volume (sound intensity) exceeding an on-threshold.

Recognition of a sound source 22 may occurs when its volume exceeds the on-threshold and this causes a new highlighted portion 24 to be positioned in the visual scene 20 at the position of the recognized sound source 22

The transition from FIG. 8A to 10A illustrates a visual scene 20 in which the method 100 comprises automatically disabling adaptation of the visual scene 20 to provide spatially-limited visual highlighting 26 of the portion 24 of the visual scene 20 in response to the sound source 22 within the visual scene 20 having a volume (sound intensity) no longer exceeding an off-threshold. The highlighting of the portion 24 of the visual scene 20 at the sound source 22 would be removed (FIG. 6A) or adapted (FIG. 6B).

The on-threshold and the off-threshold may for example be the same or different. In some but not necessarily all examples the on-threshold and/or the off-threshold may be user-programmed via a user input device. The on-threshold may be a low value so that once a sound source becomes active the highlighting 26 is switched on for that sound source 22.

The above described methods may be performed using a controller.

Implementation of the controller 300 may be as controller circuitry. The controller 300 may be implemented in hardware alone, have certain aspects in software including firmware alone or can be a combination of hardware and software (including firmware).

Figure 11A:
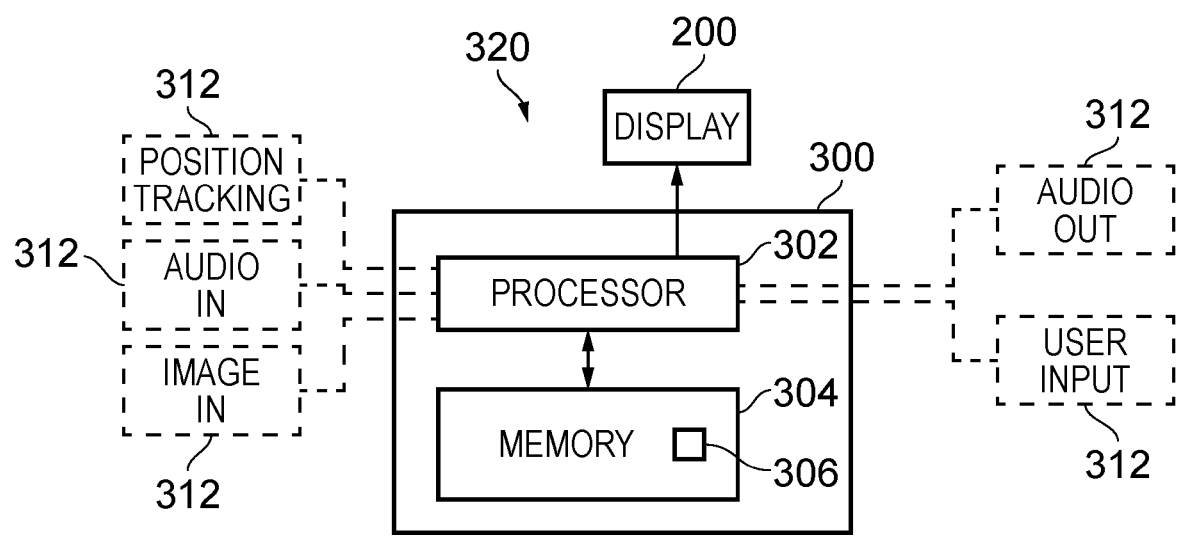
FIG. 11A illustrates an example of a controller.

As illustrated in FIG. 11A the controller 300 may be implemented using instructions that enable hardware functionality, for example, by using executable instructions of a computer program 306 in a general-purpose or special-purpose processor 302 that may be stored on a computer readable storage medium (disk, memory etc.) to be executed by such a processor 302.

The processor 302 is configured to read from and write to the memory 304. The processor 302 may also comprise an output interface via which data and/or commands are output by the processor 302 and an input interface via which data and/or commands are input to the processor 302.

The memory 304 stores a computer program 306 comprising computer program instructions (computer program code) that controls the operation of the apparatus 300 when loaded into the processor 302. The computer program instructions, of the computer program 306, provide the logic and routines that enables the apparatus to perform the methods illustrated in FIG. 1. The processor 302 by reading the memory 304 is able to load and execute the computer program 306.

The controller 300 may be part of an apparatus or system 320. The apparatus or system 320 comprise one or more peripheral components 312. The display 200 is a peripheral component. Other examples of peripheral components include: an audio output device or interface for rendering or enabling rendering of the sound scene 10 to the user; a user input device for enabling a user to control one or more parameters of the method; a positioning system for positioning a sound source; an audio input device such as a microphone or microphone array for recording a sound source; an image input device such as a camera or plurality of cameras.

The apparatus or controller 300 therefore comprises:
at least one processor 302; and
at least one memory 304 including computer program code
the at least one memory 304 and the computer program code configured to, with the at least one processor 302, cause the apparatus 300 at least to perform:
causing determining a portion of a visual scene, wherein the portion is dependent upon a position of a sound source within the visual scene; and
causing adaptation of the visual scene to provide, via a display, spatially-limited visual highlighting of the portion of the visual scene.

The controller 300 may be configured as a sound rendering engine that is configured to control characteristics of a sound object 12 defined by sound content. For example, the rendering engine may be configured to control the volume of the sound content, a position of the sound object 12 for the sound content within the sound scene 10, a spatial extent of new sound object 12 for the sound content within the sound scene 10, and other characteristics of the sound content such as, for example, tone or pitch or spectrum or reverberation etc. The sound object may, for example, be rendered via an audio output device or interface.

The sound rendering engine may, for example be a spatial audio processing system that is configured to control the position and/or extent of a sound object 12 within a sound scene 10.

The distance of a sound object 12 from an origin at the user may be controlled by using a combination of direct and indirect processing of audio signals representing the sound object 12.

The audio signals are passed in parallel through a "direct" path and one or more "indirect" paths before the outputs from the paths are mixed together. The direct path represents audio signals that appear, to a listener, to have been received directly from an audio source and an indirect (decorrelated) path represents audio signals that appear to a listener to have been received from an audio source via an indirect path such as a multipath or a reflected path or a refracted path. Modifying the relative gain between the direct path and the indirect paths, changes the perception of the distance D of the sound object 12 from the listener in the rendered sound scene 10. Increasing the indirect path gain relative to the direct path gain increases the perception of distance. The decorrelated path may, for example, introduce a pre-delay of at least 2 ms.

In some situations, for example when the sound scene 10 is rendered to a listener through a head-mounted audio output device, for example headphones using binaural audio coding, it may be desirable for the rendered sound space to remain fixed in space when the listener turns their head in space. This means that the rendered sound space needs to be rotated relative to the audio output device by the same amount in the opposite sense to the head rotation. The orientation of the rendered sound space tracks with the rotation of the listener's head so that the orientation of the rendered sound space remains fixed in space and does not move with the listener's head. The system uses a transfer function to perform a transformation T that rotates the sound object 12s within the sound space. For example, a head related transfer function (HRTF) interpolator may be used for binaural audio. As another example, Vector Base Amplitude Panning (VBAP) may be used for loudspeaker format (e.g. 5.1) audio.

The sound scene 10 may be considered to be a collection of spatial channels where each spatial channel is a different direction. In some examples, the collection of spatial channels may be globally defined for all sound object 12s. In other examples, the collection of spatial channels may be locally defined for each sound object 12. The collection of spatial channels may be fixed or may vary dynamically. In some but not necessarily all examples, each spatial audio channel may be rendered as a single sound source using amplitude panning.

For example, in spherical polar co-ordinates the direction of the spatial channel $S_{nm}$ may be represented by the couplet of polar angle $\vartheta_n$ and azimuthal angle $\phi_m$. Where $\vartheta_n$ is one polar angle in a set of N possible polar angles and $\phi_m$ is one azimuthal angle in a set of M possible azimuthal angles.

A sound object 12 at position z may be associated with the spatial channel $S_{nm}$ that is closest to Arg(z).

If a sound object 12 is associated with a spatial channel $S_{nm}$ then it is rendered as a point source.

A sound object 12 may however have spatial extent and be associated with a plurality of spatial audio channels. For example a sound object 12 may be simultaneously rendered in a set of spatial channels {S} defined by Arg(z) and a spatial extent of the sound object 12. That set of spatial channels {S} may, for example, include the set of spatial channels $S_{n'm'}$ or each value of n' between $n-\delta_n$ and $n+\delta_n$ and of m' between $n-\delta_m$ and $n+\delta_m$ where n and m define the spatial channel closest to Arg(z) and $\delta_n$ and $\delta_m$ define in combination a spatial extent of the sound object 12. The value of $\delta_n$, defines a spatial extent in a polar direction and the value of $\delta_m$ defines a spatial extent in an azimuthal direction.

The number of spatial audio channels and their spatial relationship in the set of spatial channels {S} is dependent upon the desired spatial extent of the sound object 12.

A sound object 12 may be simultaneously rendered in a set of spatial channels {S} by decomposing the audio signal representing the sound object 12 into multiple different frequency bands thereby creating multiple spectrally-limited audio signals and placing the spectrally-limited audio signals into the set of spatial audio channels {S}. For example, each spectrally-limited audio signal is placed in one spatial audio channel and each spatial audio channel comprises only one spectrally-limited audio signal, that is, there is a one-to-one mapping between the spectrally-limited audio signals and the spatial audio channels. In some but not necessarily all examples, each spectrally-limited audio signal may be rendered as a single sound source using amplitude panning.

For example, if the set of spatial channels {S} comprised X channels, the audio signal representing the sound object 12 would be separated into X different spectrally-limited audio signals in different non-overlapping frequency bands. This may be achieved using a filter bank comprising a band pass limited filter for each spatial audio channel or by using digital signal processing to distribute time-frequency bins to different spatial audio channels. Each of the X different spectrally-limited audio signals in different non-overlapping frequency bands would be provided to only one of the set of spatial audio channels {S}. Each of the set of spatial audio channels {S} would comprise only one of the X different spectrally-limited audio signals in different non-overlapping frequency bands.

Where digital signal processing is used to distribute time-frequency bins to different spatial audio channels, then a short-term Fourier transform (STFT) may be used to transform from the time domain to the frequency domain, where selective filtering occurs for each frequency band followed by an inverse transform to create the spectrally-limited audio signals for that frequency band. The different spectrally-limited audio signals may be created using the same time period or different time periods for each STFT. The different spectrally-limited audio signals may be created by selecting frequency bands of the same bandwidth (different center frequencies) or different bandwidths. The different spatial audio channels {S} into which the spectrally-limited audio signals are placed may be defined by a constant angular distribution e.g. the same solid angle ($\Delta\Omega$=sin $\theta \cdot \Delta\theta \cdot \Delta\phi$ in spherical coordinates) or by a non-homogenous angular distribution e.g. different solid angles.

Which spectrally-limited audio signal is allocated to which spatial audio channel in the set of spatial audio channels {S} may be controlled by random allocation or may be determined based on a set of predefined rules.

The predefined rules may, for example, constrain spatial-separation of spectrally-adjacent spectrally-limited audio signals to be above a threshold value. Thus spectrally-limited audio signals in adjacent frequency bands may be separated spatially so that they are not spatially adjacent. In some examples, effective spatial separation of the multiple frequency bands may be maximized.

The predefined rules may additionally or alternatively define how the spectrally-limited audio signals are distributed amongst the set of spatial audio channels {S}. For example, a low discrepancy sequence such as a Halton sequence, for example, may be used to pseudo-randomly distribute the spectrally-limited audio signals amongst the set of spatial audio channels {S}.

The controller 300 may be configured as a visual content rendering engine that is configured to highlighting 26 of a portion 24 of a visual scene 20.

Figure 11B:
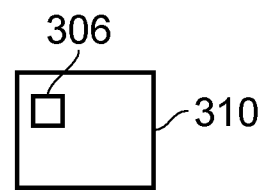
FIG. 11B illustrates an example of a computer program.

As illustrated in FIG. 11B, the computer program 306 may arrive at the apparatus 300 via any suitable delivery mechanism 310. The delivery mechanism 310 may be, for example, a non-transitory computer-readable storage medium, a computer program product, a memory device, a record medium such as a compact disc read-only memory (CD-ROM) or digital versatile disc (DVD), an article of manufacture that tangibly embodies the computer program 306. The delivery mechanism may be a signal configured to reliably transfer the computer program 306. The apparatus 300 may propagate or transmit the computer program 306 as a computer data signal.

Although the memory 304 is illustrated as a single component/circuitry it may be implemented as one or more separate components/circuitry some or all of which may be integrated/removable and/or may provide permanent/semi-permanent/dynamic/cached storage.

Although the processor 302 is illustrated as a single component/circuitry it may be implemented as one or more separate components/circuitry some or all of which may be integrated/removable. The processor 302 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' refers to all of the following:

(a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

The blocks illustrated in the FIG. 1 may represent steps in a method and/or sections of code in the computer program 306. The illustration of a particular order to the blocks does not necessarily imply that there is a required or preferred order for the blocks and the order and arrangement of the block may be varied. Furthermore, it may be possible for some blocks to be omitted.

Where a structural feature has been described, it may be replaced by means for performing one or more of the functions of the structural feature whether that function or those functions are explicitly or implicitly described.

The controller 300 may, for example be a module. 'Module' refers to a unit or apparatus that excludes certain parts/components that would be added by an end manufacturer or a user.

According to some but not necessarily all examples, some or all of the features of the examples illustrated in FIGS. 3A, 3C (and 3B, 3D) may be used with some or all of the features of any of the examples illustrated in the other Figs. According to some but not necessarily all examples, some or all of the features of the examples illustrated in FIGS. 4A (and 4B) may be used with some or all of the features of any of the examples illustrated in the other Figs. According to some but not necessarily all examples, some or all of the features of the examples illustrated in FIGS. 5A (and 5B) may be used with some or all of the features of any of the examples illustrated in the other Figs. According to some but not necessarily all examples, some or all of the features of the examples illustrated in FIGS. 6A and/or 6B may be used with some or all of the features of any of the examples illustrated in the other Figs. According to some but not necessarily all examples, some or all of the features of the examples illustrated in FIGS. 7A and/or 7B may be used with some or all of the features of any of the examples illustrated in the other Figs. According to some but not necessarily all examples, some or all of the features of the examples illustrated in FIGS. 8A (and 8B) may be used with some or all of the features of any of the examples illustrated in the other Figs. According to some but not necessarily all examples, some or all of the features of the examples illustrated in FIGS. 9A (and 9B) may be used with some or all of the features of any of the examples illustrated in the other Figs. According to some but not necessarily all examples, some or all of the features of the examples illustrated in FIGS. 10A (and 10B) may be used with some or all of the features of any of the examples illustrated in the other Figs. According to some but not necessarily all examples, some or all of the features of the examples illustrated in FIGS. 11A and/or 11B may be used with some or all of the features of any of the examples illustrated in the other Figs.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one" or by using "consisting".

In this brief description, reference has been made to various examples. The description of features or functions in relation to an example indicates that those features or functions are present in that example. The use of the term 'example' or 'for example' or 'may' in the text denotes, whether explicitly stated or not, that such features or functions are present in at least the described example, whether described as an example or not, and that they can be, but are not necessarily, present in some of or all other examples. Thus 'example', 'for example' or 'may' refers to a particular instance in a class of examples. A property of the instance can be a property of only that instance or a property of the class or a property of a sub-class of the class that includes some but not all of the instances in the class. It is therefore implicitly disclosed that a features described with reference to one example but not with reference to another example, can where possible be used in that other example but does not necessarily have to be used in that other example.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A method comprising:
    determining, by an apparatus, a portion of a visual scene defined by a visual content, wherein the portion corresponds with a position of a sound source within the visual scene, wherein the sound source is a source of a perceived audio content and is a rendered sound object in a sound scene that corresponds with the visual scene to provide a one-to-one mapping between the sound scene and the visual scene, and wherein the sound source is a point sound source rendered in a set of spatial channels, wherein at least two spatial channels in the set of spatial channels comprise a spectrally-limited audio signal, the spatial channels being in different directions and defined by spatial extent; and
    adapting, by the apparatus, the visual scene to provide, via a display, spatially-limited visual highlighting of the portion of the visual scene,
    wherein visual characteristics of the highlighted portion of the visual scene vary in response to variation in characteristics of the sound source, and
    wherein the visual characteristics of the highlighted portion of the visual scene vary dynamically as the characteristics of the sound source vary, wherein the visual characteristics of the highlighted portion comprise at least one of shape of the highlighted portion, area of the highlighted portion and maximum dimension of the highlighted portion and wherein characteristics of the sound source comprise at least one of volume of the sound source and the spatial extent of the sound source.

2. A method as claimed in claim 1, wherein the sound source is an active sound source producing sound that is rendered.

3. A method as claimed in claim 1, wherein a position of the highlighted portion of the visual scene is dependent upon the position of the sound source within the visual scene or wherein a position of the highlighted portion of the visual scene corresponds to the position of the sound source within the visual scene.

4. A method as claimed in claim 1, wherein the position of the highlighted portion of the visual scene tracks the position of the sound source within the visual scene.

5. A method as claimed in claim 1, wherein the highlighted portion of the visual scene defines a transparent window through an image filter applied to the visual scene and wherein the applied image filter reduces image sharpness of the visual scene.

6. An apparatus comprising at least one processor; and at least one non-transitory memory including computer program code, the at least one memory and the computer program code configured to, with the at least one processor, cause the apparatus at least to:

determine a portion of a visual scene defined by a visual content, wherein the portion corresponds with a position of a sound source within the visual scene, wherein the sound source is a source of a perceived audio content and is a rendered sound object in a sound scene that corresponds with the visual scene to provide a one-to-one mapping between the sound scene and the visual scene, and wherein the sound source is a point sound source configured to be rendered in a set of spatial channels, wherein at least two spatial channels comprise a spectrally-limited audio signal, the spatial channels being in different directions and defined by spatial extent; and adapt the visual scene to provide, via a display, spatially-limited visual highlighting of the portion of the visual scene, wherein visual characteristics of the highlighted portion of the visual scene vary dynamically as characteristics of the sound source vary, and wherein the visual characteristics of the highlighted portion comprise at least one of shape of the highlighted portion, area of the highlighted portion and maximum dimension of the highlighted portion and wherein characteristics of the sound source comprise at least one of volume of the sound source and the spatial extent of the sound source.

7. The apparatus as claimed in claim 6, wherein the sound source is an active sound source producing sound that is rendered.

8. The apparatus as claimed in claim 6, wherein the sound source is the sound object within the sound scene corresponding to the visual scene or is a visual object within the visual scene associated with the sound source.

9. The apparatus as claimed in claim 6, wherein a position of the highlighted portion of the visual scene is dependent upon the position of the sound source within the visual scene or wherein a position of the highlighted portion of the visual scene corresponds to the position of the sound source within the visual scene.

10. The apparatus as claimed in claim 6, wherein the position of the highlighted portion of the visual scene tracks the position of the sound source within the visual scene.

11. The apparatus as claimed in claim 6, configured to automatically enable adaptation of the visual scene to provide the spatially-limited visual highlighting of the portion of the visual scene in response to the sound source within the visual scene having a volume exceeding an on-threshold.

12. The apparatus as claimed in claim 6, configured to automatically disable adaptation of the visual scene to provide the spatially-limited visual highlighting of the portion of the visual scene in response to the sound source within the visual scene having a volume no longer exceeding an on-threshold.

13. The apparatus as claimed in claim 6, wherein adaptation of the visual scene to provide spatially-limited visual highlighting of the portion of the visual scene comprises:

visually differentiate the highlighted portion of the visual scene from at least neighboring portions of the visual scene by applying a visual effect to a first area of the visual scene but not a second adjacent area of the visual scene, wherein the first area is the highlighted portion of the visual scene and the second area is neighboring portions of the visual scene adjacent the highlighted portion or wherein the second area is the highlighted portion of the visual scene and the first area is neighboring portions of the visual scene adjacent the highlighted portion.

14. The apparatus as claimed in claim 6, wherein the highlighted portion of the visual scene defines a transparent window through an image filter applied to the visual scene and wherein the applied image filter reduces image sharpness of the visual scene.

15. The apparatus as claimed in claim 6, wherein adaptation of the visual scene to provide spatially-limited visual highlighting of the portion of the visual scene is dynamically varied over time.

16. The apparatus as claimed in claim 6 configured to:

determine multiple portions of a visual scene, wherein the multiple portions correspond with positions of multiple sound sources within the visual scene; and adapt the visual scene to provide, via the display, spatially-limited visual highlighting of the multiple portions of the visual scene, wherein a position of each highlighted portion of the visual scene is dependent upon a position of a sound source within the visual scene.

17. The apparatus as claimed in claim 16, further configured to enable merging of distinct highlighted portions of the visual scene to form a new single highlighted portion of the visual scene.

18. A non-transitory computer-readable storage medium having stored thereon computer-readable code, which, when executed by at least one processor, causes the at least one processor to perform:

determining a portion of a visual scene defined by a visual content, wherein the portion corresponds with a position of a sound source within the visual scene, wherein the sound source is a source of a perceived audio content and is a rendered sound object in a sound scene that corresponds with the visual scene to provide a one-to-one mapping between the sound scene and the visual scene, and wherein the sound source is a point sound source rendered from a set of spatial channels, wherein at least two spatial channels comprise a spectrally-limited audio signal, the spatial channels being in different directions and defined by spatial extent; and adapting the visual scene to provide, via a display, spatially-limited visual highlighting of the portion of the visual scene, wherein visual characteristics of the highlighted portion of the visual scene vary dynamically as characteristics of the sound source vary, and wherein the visual characteristics of the highlighted portion comprise at least one of shape of the highlighted portion, area of the highlighted portion and maximum dimension of the highlighted portion and wherein characteristics of the sound source comprise at least one of volume of the sound source and the spatial extent of the sound source.

* * * * *